Patented July 9, 1946

2,403,767

UNITED STATES PATENT OFFICE 2,403,767

RESINATE

Harold M. Spurlin, Marshallton, Del., assignor to Hercules Powder Company, Wilmington, Del., a corporation of Delaware No Drawing. Application August 16, 1943, Serial No. 498,876

12 Claims. (Cl. 260—100)

This invention relates to a new composition of matter and a method for its production. More particularly, it is concerned with a new resin compound and with a method for its production.

In accordance with this invention, it has been found that aluminum alkoxide diresinates may be prepared, free of excess resin acids and impurities, by reacting aluminum trialkoxide with rosin in the proportion of 1 mol of aluminum trialkoxide to 2 mols of rosin. The reaction may be carried out in the presence of an anhydrous solvent which does not react with the product. If desired, the aluminum monoalkoxide diresinate may be used in solution or the alcohol set free may be distilled off.

Having thus indicated the general nature and purpose of the invention, the following examples are given to illustrate the preparation of the new resin compound. In the examples, the term "parts" represents weight units unless otherwise indicated.

Example 1

302 parts of rosin crystals and 102 parts of aluminum triisopropoxide in Varso (a straight-run petroleum fraction boiling between 300°–400° F.) were heated to 150° C. to distill off 60 parts of isopropyl alcohol. The residue was a solution of aluminum isopropoxide diresinate in Varsol. On addition of 3150 parts of dry isopropyl alcohol, the aluminum isopropoxide diresinate precipitated as a resin which was completely soluble in xylene.

Example 2

85 parts of rosin crystals were dissolved in 200 parts of dry butanol containing 29 parts of aluminum triisopropoxide. A clear solution resulted and dilution with 1200 parts of butanol caused no precipitate of aluminum dialkoxide monoresinate which is insoluble in butanol.

As shown in the examples, the aluminum alkoxide diresinate is prepared by reacting aluminum trialkoxide and rosin in the proportion of 1 mol of aluminum trialkoxide to 2 mols of rosin, either with or without distilling off the alcohol set free. While aluminum triisopropoxide has been used as the aluminum trialkoxide, other trialkoxides of aluminum, such as methoxide, ethoxide, propoxide, butoxide, etc., may be used. However, it is preferable to use the triisopropoxide or tributoxide, since aluminum triisopropoxide and tributoxide are more readily prepared, the triisopropoxide being the lower boiling and, therefore, the more readily purified, and the methoxide and ethoxide are both quite insoluble in most solvents and, therefore, difficult to work with.

The reaction may be carried out in the presence or absence of an anhydrous solvent which does not react with the product. Hence, in place of Varsol and butanol shown in the examples, xylene, hexane, diisopropyl ether, carbon tetrachloride, etc., may be used. If it is desired to make use of a solution of aluminum alkoxide diresinate, a suitable solvent would be, for example, a higher alcohol, such as isopropyl, butyl, amyl, and the like, or a hydrocarbon solvent, such as xylene, hexane, isopropyl ether, carbon tetrachloride, etc. When an alcohol is used for a solvent, the alkoxide group of the aluminum alkoxide diresinate will be partially exchanged for the alkoxide group corresponding to the alcohol solvent.

Since the alkoxide group of the aluminum alkoxide diresinate is readily hydrolyzed by water, anhydrous conditions must be used in the preparation of the diresinates and dry solvents must be used.

The term "rosin" as defined herein and in the claims, and which may be used in the preparation of aluminum alkoxide diresinates, includes any wood or gum rosin, rosin crystals, oleoresin, rosin acids obtainable therefrom, such as abietic acid, pimaric acid, sapinic acid, etc., as well as mixtures thereof. In addition, it includes the modified rosins, such as hydrogenated rosin, heat-treated rosin, polymerized rosin, and the like.

In carrying out the process described in the invention, an aluminum trialkoxide, such as, for example, aluminum triisopropoxide, and rosin are reacted in the proportion of 1 mol of aluminum trialkoxide to 2 mols of rosin and, if desired, the alcohol set free may be distilled off. The reaction may be carried out in the presence or absence of an anhydrous solvent. If the alcohol has been driven off, a higher alcohol, such as dry isopropyl alcohol, may be added to the residue and aluminum alkoxide diresinate will be precipitated as a resin. The product can be easily recovered by filtration. Any other suitable method of recovering the aluminum alkoxide diresinate may be used.

If a solution of aluminum alkoxide diresinate is desired, the rosin and aluminum trialkoxide may be dissolved in a higher alcohol, such as butanol, or in any hydrocarbon, ether, or chlorinated solvent, and a clear solution of aluminum alkoxide diresinate results.

There is thus provided by this invention a new composition of matter, aluminum alkoxide diresinate, free of excess acid and impurities, and a method for preparing it.

This diresinate is a definite compound which is insoluble in isopropyl alcohol in contrast with the dialkoxide monoresinate and triresinate, both of which are quite soluble in this alcohol.

What I claim and desire to protect by Letters Patent is:

1. As a product, aluminum isopropoxide diresinate.

2. The method of producing aluminum isopropoxide diresinate which comprises reacting under anhydrous conditions aluminum triisopropoxide and rosin in the proportion of 1 mol of aluminum triisopropoxide to 2 mols of rosin.

3. The method of producing aluminum isopropoxide diresinate which comprises reacting under anhydrous conditions aluminum triisopropoxide and rosin crystals in the proportion of 1 mol of aluminum triisopropoxide to 2 mols of rosin crystals.

4. The method of producing aluminum isopropoxide diresinate which comprises reacting aluminum triisopropoxide and rosin crystals in the proportion of 1 mol of aluminum triisopropoxide to 2 mols of rosin crystals in the presence of an anhydrous solvent.

5. The method of producing aluminum isopropoxide diresinate which comprises reacting aluminum triisopropoxide and rosin crystals in the proportion of 1 mol of aluminum triisopropoxide to 2 mols of rosin crystals in the presence of an anhydrous solvent, distilling off the alcohol set free, and recovering aluminum isopropoxide diresinate from the solution.

6. The method of producing aluminum isopropoxide diresinate which comprises reacting under anhydrous conditions aluminum triisopropoxide and polymerized rosin in the proportion of 1 mol of aluminum triisopropoxide to 2 mols of polymerized rosin.

7. The method of producing aluminum isopropoxide diresinate which comprises reacting aluminum triisopropoxide and polymerized rosin in the proportion of 1 mol of aluminum triisopropoxide to 2 mols of polymerized rosin in the presence of an anhydrous solvent.

8. The method of producing aluminum isopropoxide diresinate which comprises reacting aluminum triisopropoxide and polymerized rosin in the proportion of 1 mol of aluminum triisopropoxide to 2 mols of polymerized rosin in the presence of an anhydrous solvent, distilling off the alcohol set free, and recovering aluminum isopropoxide diresinate from the solution.

9. The method of producing aluminum isopropoxide diresinate which comprises reacting under anhydrous conditions aluminum triisopropoxide and hydrogenated rosin in the proportion of 1 mol of aluminum triisopropoxide to 2 mols of hydrogenated rosin.

10. The method of producing aluminum isopropoxide diresinate which comprises reacting aluminum triisopropoxide and hydrogenated rosin in the proportion of 1 mol of aluminum triisopropoxide to 2 mols of hydrogenated rosin in the presence of an anhydrous solvent.

11. The method of producing aluminum isopropoxide diresinate which comprises reacting aluminum triisopropoxide and hydrogenated rosin in the proportion of 1 mol of aluminum triisopropoxide to 2 mols of hydrogenated rosin in the presence of an anhydrous solvent, distilling off the alcohol set free, and recovering aluminum isopropoxide diresinate from the solution.

12. The method of producing aluminum isopropoxide diresinate which comprises reacting under anhydrous conditions aluminum triisopropoxide with rosin in the proportion of 1 mol of aluminum triisopropoxide to 2 mols of rosin, contacting the aluminum isopropoxide diresinate so formed with anhydrous isopropyl alcohol and separating said aluminum isopropoxide diresinate in a purified state as a residue insoluble in said isopropyl alcohol.

HAROLD M. SPURLIN.